(12) United States Patent
Inoue et al.

(10) Patent No.: US 8,376,883 B2
(45) Date of Patent: Feb. 19, 2013

(54) POWER TRANSMISSION DEVICE

(75) Inventors: Yuya Inoue, Nagaokakyo (JP); Shinji Yamane, Kashiba (JP); Yoshihisa Miura, Yamatokoriyama (JP); Teruko Nagaoka, Settsu (JP)

(73) Assignee: JTEKT Corporation, Osaka (JP)

( * ) Notice: Subject to any disclaimer, the term of this patent is extended or adjusted under 35 U.S.C. 154(b) by 167 days.

(21) Appl. No.: 12/844,222

(22) Filed: Jul. 27, 2010

(65) Prior Publication Data

US 2011/0034278 A1 Feb. 10, 2011

(30) Foreign Application Priority Data

Aug. 7, 2009 (JP) .................................. 2009-183992
Apr. 19, 2010 (JP) .................................. 2010-095595

(51) Int. Cl.
*F16H 7/18* (2006.01)
*F16H 7/08* (2006.01)
*F16H 55/56* (2006.01)
(52) U.S. Cl. ............. 474/140; 474/109; 474/111; 474/8
(58) Field of Classification Search ................ 474/8, 18, 474/109, 111, 140, 144–147
See application file for complete search history.

(56) References Cited

U.S. PATENT DOCUMENTS

| 952,647 | A | * | 3/1910 | Sorensen | 474/145 |
|---|---|---|---|---|---|
| 3,111,039 | A | * | 11/1963 | Peras | 474/111 |
| 4,471,851 | A | * | 9/1984 | Kamiya et al. | 180/219 |
| 4,642,073 | A | * | 2/1987 | Ancarani Restelli | 474/111 |
| 6,435,994 | B1 | | 8/2002 | Friedmann et al. | |
| 7,354,364 | B2 | * | 4/2008 | Glas et al. | 474/140 |
| 7,691,019 | B2 | * | 4/2010 | Gogo | 474/140 |
| 8,057,336 | B2 | * | 11/2011 | Wodtke et al. | 474/145 |
| 2005/0277500 | A1 | * | 12/2005 | Bitzer et al. | 474/1 |
| 2007/0087877 | A1 | * | 4/2007 | McGarry | 474/144 |
| 2011/0244999 | A1 | * | 10/2011 | Nakamura et al. | 474/91 |

FOREIGN PATENT DOCUMENTS

| JP | A 2000-304115 | 11/2000 |
|---|---|---|
| JP | A 2009-085397 | 4/2009 |

OTHER PUBLICATIONS

Search Report issued in EP 10171983.9, mailed Nov. 24, 2010.

* cited by examiner

*Primary Examiner* — Michael Mansen
*Assistant Examiner* — Minh Truong
(74) *Attorney, Agent, or Firm* — Oliff & Berridge, PLC

(57) ABSTRACT

A power transmission device includes a tubular stabilizer which is arranged between a primary pulley and a secondary pulley, and through which a string portion of a power transmitting chain is passed so as to be movable relative to the stabilizer whereby movement of the power transmitting chain is restricted. The stabilizer is supported by the power transmitting chain and is moved in the traveling direction of the power transmitting chain as the power transmitting chain moves in the traveling direction, and a movement of the stabilizer of which the amount is larger than or equal to a predetermined amount is restricted by a restricting device.

7 Claims, 10 Drawing Sheets

POWER TRANSMISSION DEVICE

INCORPORATION BY REFERENCE

The disclosures of Japanese Patent Applications No. 2009-183992 filed on Aug. 7, 2009 and No. 2010-095595 filed on Apr. 19, 2010, including the specifications, drawings and abstracts, are incorporated herein by reference in their entireties.

BACKGROUND OF THE INVENTION

1. Field of the Invention

The invention relates to a power transmission device suitable for a continuously variable transmission of a vehicle, such as an automobile.

2. Description of the Related Art

There is a known continuously variable transmission for an automobile (power transmission device) (see Japanese Patent Application Publication No. 2000-304115 (JP-A-2000-304115)). The continuously variable transmission includes a primary pulley, a secondary pulley, a looped transmitting member, a casing and a guide rail. The primary pulley is formed of a fixed sheave and a movable sheave, each having a conical sheave surface. The secondary pulley is formed of a fixed sheave and a movable sheave, each having a conical sheave surface. The looped transmitting member is looped over the both pulleys. The casing accommodates these members. The guide rail is supported by the casing, and a string portion of the looped transmitting member is passed through the guide rail so as to be movable relative to the guide rail. Thus, the movement of the looped transmitting member is restricted.

In this type of power transmission device, the portions (string portions) of the looped transmitting member, which are between the pulleys, easily vibrate (string vibrations easily occur) because these portions are not retained by the pulleys. Because these vibrations generate harsh sound (a frequency of approximately 3000 Hz to 4000 Hz), the level of the noise is high. In the power transmission device described in JP-A-2000-304115, string vibrations are reduced by the guide rail supported by the casing. With the power transmission device described in JP-A-2000-304115, string vibrations are reduced. However, the frequency of sound generated due to the string vibrations does not change. Therefore, harsh noise remains. In addition, it is necessary to fit and fix a stabilizer to a fixing stopper. Therefore, further improvement is demanded in order to enhance the ease of assembly and to reduce the cost.

SUMMARY OF INVENTION

The invention provides a power transmission device with which string vibrations are reduced, level of noise is decreased by changing the frequency of sound generated due to string vibrations, and the ease of assembly is enhanced to reduce the cost.

An aspect of the invention relates to a power transmission device that includes: a primary pulley that is formed of a fixed sheave and a movable sheave; a secondary pulley that is formed of a fixed sheave and a movable sheave; a looped transmitting member that is looped over the primary pulley and the secondary pulley; a casing that accommodates the primary pulley, the secondary pulley and the looped transmitting member; and a tubular stabilizer which is arranged between the primary pulley and the secondary pulley, and through which a string portion of the looped transmitting member is passed so as to be movable relative to the stabilizer whereby movement of the looped transmitting member is restricted. The stabilizer is supported by the looped transmitting member and is moved in a traveling direction of the looped transmitting member as the looped transmitting member moves in the traveling direction. A movement of the stabilizer of which the amount is equal to or larger than a predetermined amount is restricted by a restricting device.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

Figure 1:
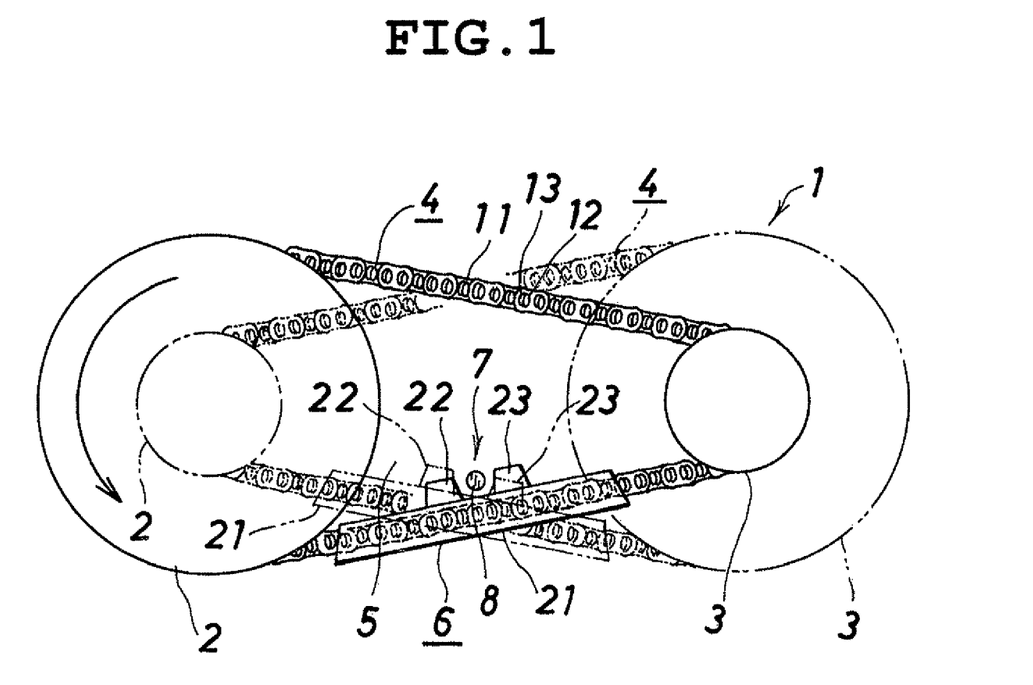
FIG. 1 is a front view that shows a power transmission device according to a first embodiment of the invention.
Figure 2:
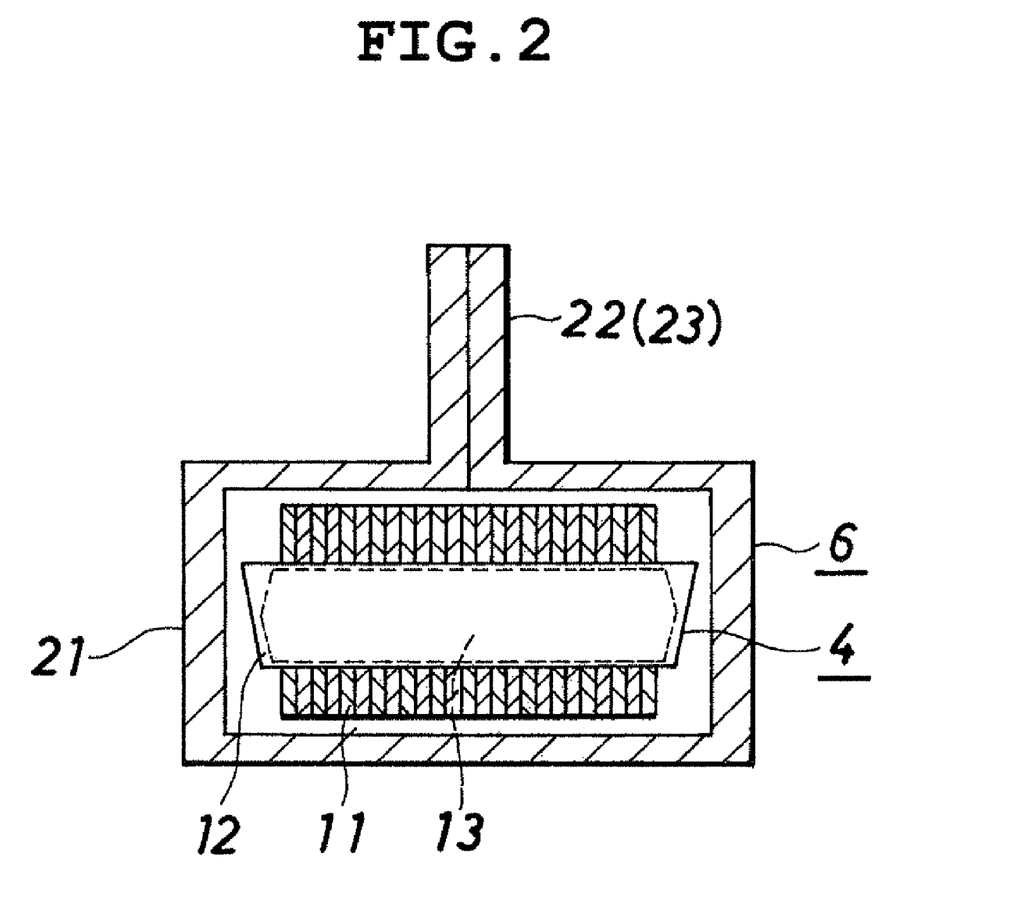
FIG. 2 is a view of a main portion when viewed in the traveling direction.

FIG. 1 and FIG. 2 show a power transmission device according to a first embodiment of the invention. A power transmission device 1 includes a primary pulley 2, a secondary pulley 3, a power transmitting chain (looped transmitting member) 4, a casing 5, a stabilizer 6 and a restricting device 7. The primary pulley 2 is formed of a fixed sheave and a movable sheave. The secondary pulley 3 is formed of a fixed sheave and a movable sheave. The power transmitting chain 4 is looped over these pulleys 2 and 3. The casing 5 accommodates these members. The stabilizer 6 is supported by the looped transmitting member 4 at a position between the primary pulley 2 and the secondary pulley 3. The restricting device 7 restricts the movement of the stabilizer 6.

The power transmitting chain 4 includes a plurality of links 11, a plurality of pins (first pins) 12, a plurality of interpieces (second pins) 13. Each of the links 11 has front and rear insertion portions that are formed at a predetermined distance in a chain longitudinal direction. The pins 12 and the interpieces 13 couple the links 11 aligned in a chain widthwise direction in such a manner that the links 11 are bendable relative to each other in the longitudinal direction. The pins 12 and the interpieces 13 move while rolling and contacting each other. As a result, the links 11 may be bendable relative to each other in the longitudinal direction (front-rear direction).

In the power transmission device 1, the speed ratio is changed between an under drive (hereinafter, referred to as "U/D") that has a maximum speed ratio and that corresponds to a low-speed drive and an over drive (hereinafter, referred to as "O/D") that has a minimum speed ratio and that corresponds to a high-speed drive. In an U/D state (indicated by the alternate long and two short dashes line in FIG. 1), the effective radius on the primary pulley 2-side is minimum, and the effective radius on the secondary pulley 3-side is maximum. On the other hand, in an O/D state (indicated by the solid line in FIG. 1), the effective radius on the primary pulley 2-side is maximum, and the effective radius on the secondary pulley 3-side is minimum.

The stabilizer 6 is formed of a tubular body 21 and a pair of ribs 22 and 23. The paired ribs 22 and 23 are integrally formed with the body 21 and constitute the restricting device 7.

The restricting device 7 is formed of a columnar fixing stopper 8 and the pair of ribs 22 and 23. The fixing stopper 8 is fitted to the casing 5. The ribs 22 and 23 are engageable with the fixing stopper 8.

As shown in FIG. 2, the stabilizer 6 is made of synthetic resin and has a two-part shape. The power transmitting chain 4 looped over both pulleys 2 and 3 is interposed between the two parts of the stabilizer 6, and then the two parts are connected to each other by welding. In this way, the stabilizer 6 is fitted to the power transmitting chain 4. The cross section of the tubular body 21 is formed in a rectangular shape having such a size that the links 11, the pins 12 and the interpieces 13 are passed through tubular body 21 with slight play. Therefore, a string portion (portion that is not retained by the pulleys 2 and 3) of the power transmitting chain 4 is passed through the stabilizer 6 so as to be movable relative to the stabilizer 6. With this arrangement, movement of the string portion of the power transmitting chain 4 in a direction perpendicular to the traveling direction is restricted by the stabilizer 6.

The stabilizer 6 is not supported by the casing 5. When the power transmitting chain 4 shifts from the U/D state to the O/D state, the inclination angle of the stabilizer 6 changes with displacement of the power transmitting chain 4 as indicated by the alternate long and short dashes line and the solid line in FIG. 1. In addition, the paired ribs 22 and 23 of the stabilizer 6 are formed so as to face each other via the fixing stopper 8 fitted to the casing 5, and the distance between the ribs 22 and 23 is larger than the size of the fixing stopper 8. Thus, the stabilizer 6 is allowed to move by a small amount in the traveling direction of the power transmitting chain 4 as the power transmitting chain 4 moves in the traveling direction. The first rib 22 contacts the fixing stopper 8 during the forward rotation (rotation in the direction indicated by the arrow) to restrict the travel range of the stabilizer 6. The second rib 23 contacts the stopper 8 during the reverse rotation to restrict the travel range of the stabilizer 6.

In this case, it is not necessary to fix or fit the stabilizer 6 to the casing 5, and it is possible to omit the work for fitting and fixing the stabilizer to the fixing stopper, which is necessary in the existing art. Thus, the ease of assembly improves, and the cost is reduced. In addition, due to a gap between the fixing stopper 8 and each of the ribs 22 and 23 (this gap is not formed in the existing art), a shock of an impact between the fixing stopper 8 and each of the ribs 22 and 23 is reduced.

With the power transmission device 1, because the movement of the string portion of the power transmitting chain 4 in the direction perpendicular to the traveling direction is restricted by the stabilizer 6, string vibrations are reduced. In addition, because the stabilizer 6 is supported by the string portion of the power transmitting chain 4, the natural frequency of the string portion increases as the stabilizer 6 becomes longer as described below.

Figure 6:
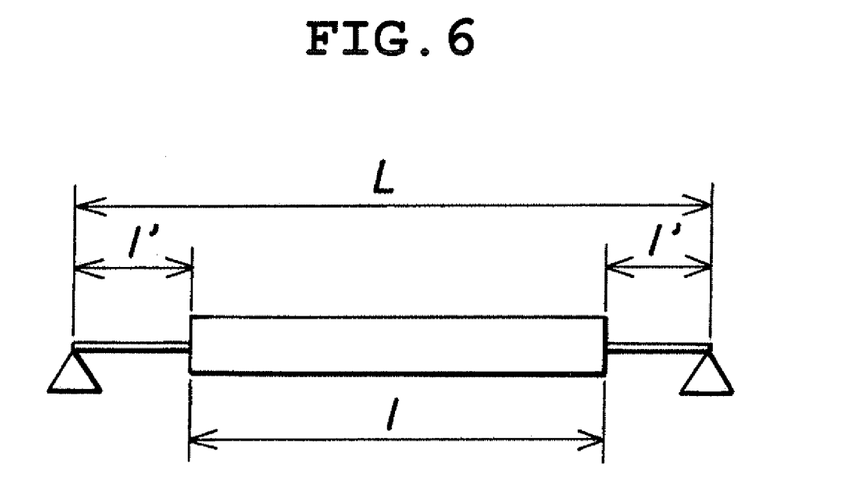
FIG. 6 is a view that shows a model for analyzing a vibration mode of the power transmission device according to the invention.

FIG. 6 is a model of the stabilizer 6 in the power transmission device 1 according to the invention. L denotes the distance between the pulleys 2 and 3 along the power transmitting chain 4, that is, the length of the string portion when no stabilizer 6 is provided, l denotes the length of the stabilizer 6, and l' denotes the length of the string portion, that is, the distance from an end of the stabilizer 6 to each of the pulleys 2 and 3 (relationship among l, l' and L is expressed by L=l+2l'). The natural frequency fn of the string portion is expressed by $fn=(1/2l')(T/\rho)^{1/2}$ where T is a tensile force and $\rho$ is a linear density of the string portion of the power transmitting chain 4.

Figure 7:
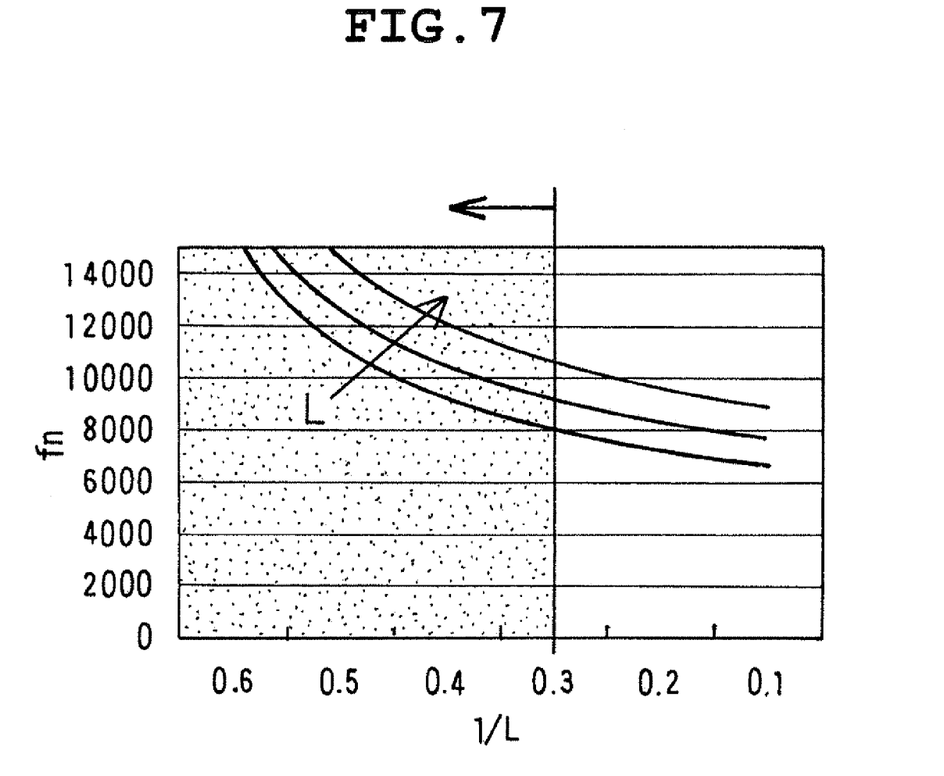
FIG. 7 is a graph that shows one example of the result of analysis of a vibration mode of the power transmission device according to the invention.

FIG. 7 shows the result of analysis that is carried out with the use of the model shown in FIG. 6. The abscissa axis represents (the length l of the stabilizer 6)/(the length L of the string portion when no stabilizer is provided), and the ordinate axis represents the natural frequency fn of the string portion.

In the power transmission device 1 of this type, when no stabilizer 6 is provided, the peak of frequency ($n^{th}$ order natural frequency) is present at 3000 Hz to 4000 Hz, and the frequency causes problematic noise. When the peak of frequency is higher than or equal to 8000 Hz, although the noise is within human audible zone, the noise does not give a discomfort. Therefore, the natural frequency of the string portion to which the stabilizer 6 is fitted is preferably higher than or equal to 8000 Hz. According to the result of analysis shown in FIG. 7, the length l of the stabilizer 6 is preferably larger than or equal to 30% of the length L of the string portion when no stabilizer 6 is provided. That is, even when the length of the stabilizer 6 is reduced to 30% of the length of the string portion using the value obtained by subtracting a movement amount from the length of the string portion as the maximum value, large noise reduction effect may be obtained.

Figure 3:
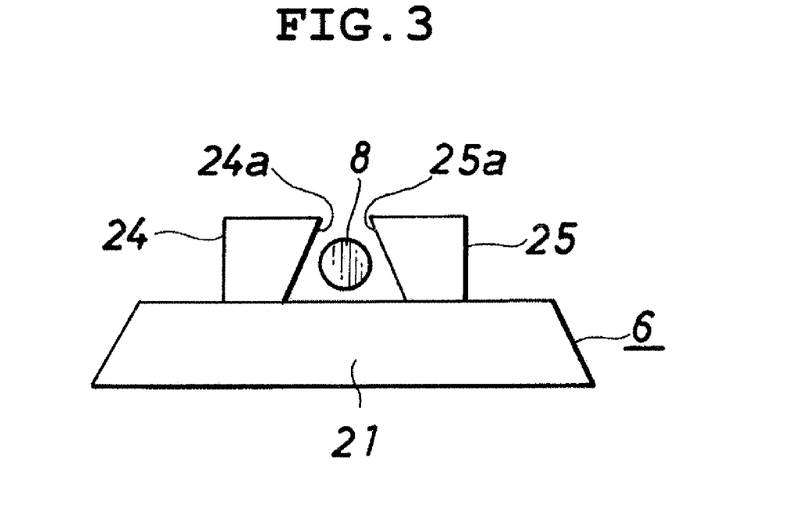
FIG. 3 is a view that shows a main portion of a power transmission device according to a second embodiment of the invention.

FIG. 3 shows a power transmission device according to a second embodiment of the invention. In the drawing, the stabilizer 6 is formed of the tubular body 21 and a pair of ribs 24 and 25. The paired ribs 24 and 25 are integrally formed with the body 21 and constitute the restricting device. The first rib 24 and the second rib 25 face each other via the fixing stopper 8. Facing surfaces 24a and 25a are tapered in the direction opposite to the direction in which the facing surfaces of the ribs 22 and 23 in the first embodiment are tapered. The distance between the facing surfaces 24a and 25a is minimum at the distal ends. The distance between the distal ends of the facing surfaces 24a and 25a is slightly smaller than the diameter of the columnar fixing stopper 8. Thus, the facing surface 24a of the first rib 24 and the facing surface 25a of the second rib 25 form a retaining portion that prevents the stabilizer 6 from slipping away from the fixing stopper 8. With this arrangement, the stabilizer 6 is prevented from falling off from the easing 5. As shown in the drawing, there is a small gap between the fixing stopper and each of the facing surface 24a of the first rib 24 and the facing surface 25a of the second rib 25. Therefore, the stabilizer 6 is allowed to move in the same manner as that in the first embodiment.

Figure 4:
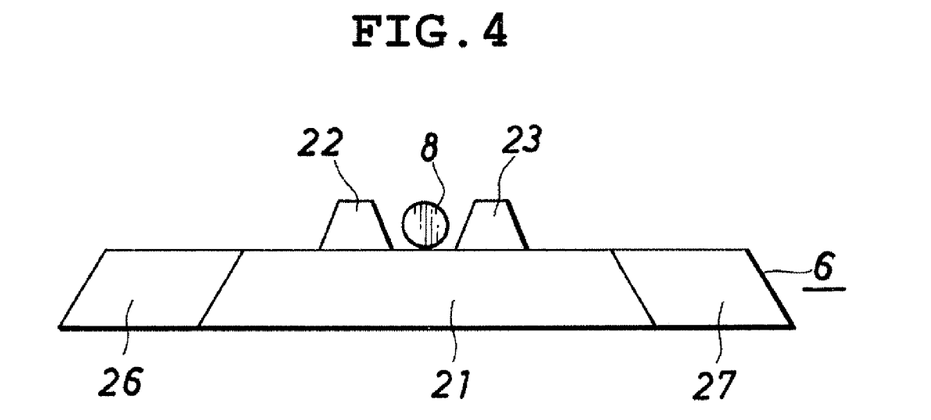
FIG. 4 is a view that shows a main portion of a power transmission device according to a third embodiment of the invention.

FIG. 4 shows a power transmission device according to a third embodiment of the invention. As shown in the drawing, length adjusting attachments 26 and 27 are detachably fitted to respective end portions of the body 21 of the stabilizer 6. Thus, the stabilizer 6 is adjustable in length so as to be usable in various power transmission devices 1 that differ in size. According to the present embodiment, a basic stabilizer 6 which has a minimum size and which conforms to the smallest power transmission device 1 is produced. When the power transmission device 1 is large, the length adjusting attachments 26 and 27 are fitted to the basic stabilizer 6. Thus, the length of the stabilizer 6 is increased so that the stabilizer 6 conforms to the large power transmission device 1. By using a plurality of sets of length adjusting attachments 26 and 27 with different lengths, it is possible to have the stabilizer 6 conform to various power transmission devices 1 that differ in size.

Figure 5:
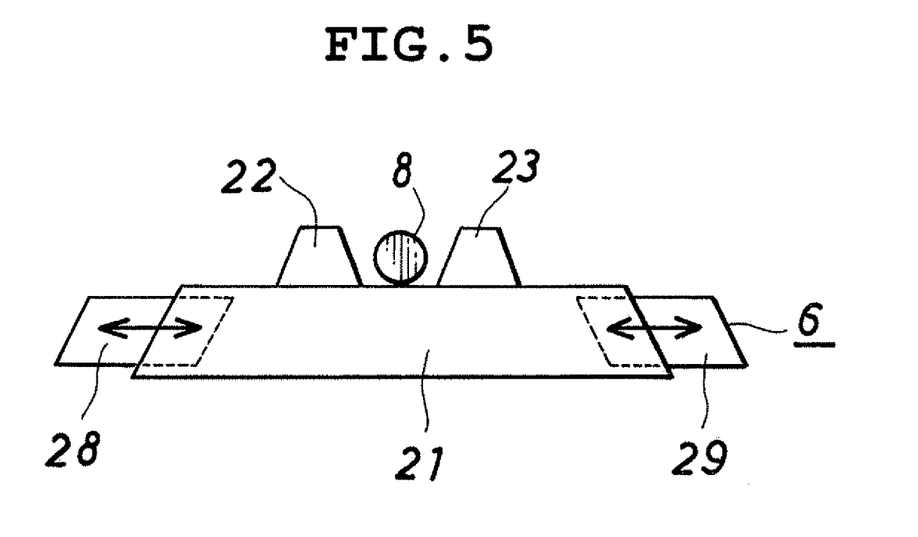
FIG. 5 is a view that shows a main portion of a power transmission device according to a fourth embodiment of the invention.

FIG. 5 shows a power transmission device according to a fourth embodiment of the invention. In the drawing, length adjusting attachments 28 and 29 are slidably fitted to respective end portions of the body 21 of the stabilizer 6. Thus, the stabilizer 6 is adjustable in length so as to be usable in various power transmission devices 1 that differ in size. According to the present embodiment, the body 21 of a basic stabilizer 6, which conforms to the smallest power transmission device 1, is produced. When the power transmission device 1 is large, the length adjusting attachments 28 and 29 are extended. Thus, the length of the stabilizer 6 is increased so that the stabilizer 6 conforms to the large power transmission device 1. By appropriately adjusting the amount by which the length adjusting attachments 28 and 29 are extended, it is possible to have the stabilizer 6 conform to various power transmission devices 1 that differ in size.

With the stabilizers 6 according to the embodiments shown in FIG. 3 to FIG. 5 as well, it is, of course, possible to obtain the effect of reducing the string vibrations and increasing the natural frequency.

Figure 8:
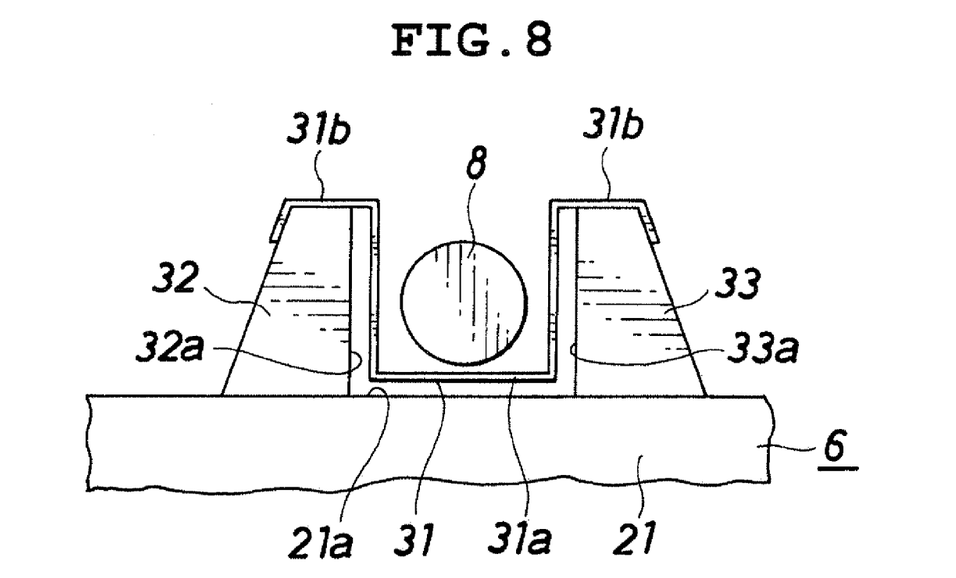
FIG. 8 is a view that shows a main portion of a power transmission device according to a fifth embodiment of the invention.

As described above, the stabilizer 6 moves with respect to the fixing stopper 8 and contacts the fixing stopper 8. Therefore, the stabilizer 6 is preferably provided with a shock absorbing member 31 or 34 that absorbs a shock when the stabilizer 6 contacts the fixing stopper 8 in order to reduce contact noise and improve durability. FIG. 8 (fifth embodiment) and FIG. 9 (sixth embodiment) show specific examples of the above configuration.

As shown in FIG. 8, the stabilizer 6 is provided with the shock absorbing member 31 made of a thin metal plate. The shock absorbing member 31 has a body portion 31a having a U-shape in cross section. The shock absorbing member 31 is attached to the stabilizer 6 when attaching portions 31b formed at opening edges of the body portion 31a are placed along the distal end portions of the ribs 32 and 33. Gaps are formed between the body portion 31a of the shock absorbing member 31 and a facing surface 21a of the body 21 and between the body portion 31a and each of facing surfaces 32a and 33a of the ribs 32 and 33 of the stabilizer 6. Thus, a shock applied to the shock absorbing member 31 is not directly transmitted to the body 21 and the ribs 32 and 33 of the stabilizer 6 because the body portion 31a elastically deforms.

Figure 9:
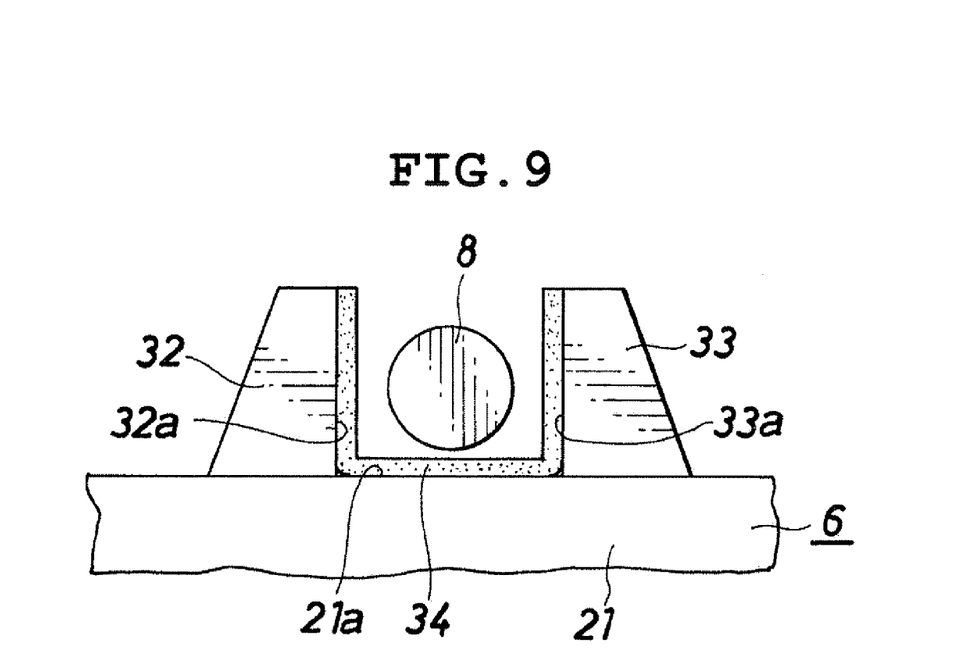
FIG. 9 is a view that shows a main portion of a power transmission device according to a sixth embodiment of the invention.

As shown in FIG. 9, the stabilizer 6 is provided with a rubber shock absorbing member 34. The shock absorbing member 34 has a U-shape in cross section, and is bonded to the facing surface 21a of the body 21 and the facing surfaces 32a and 33a of the ribs 32 and 33 of the stabilizer 6. Thus, a shock applied to the shock absorbing member 34 is not directly transmitted to the body 21 and the ribs 32 and 33 of the stabilizer 6 because the rubber shock absorbing member 34 elastically deforms.

Figure 10:
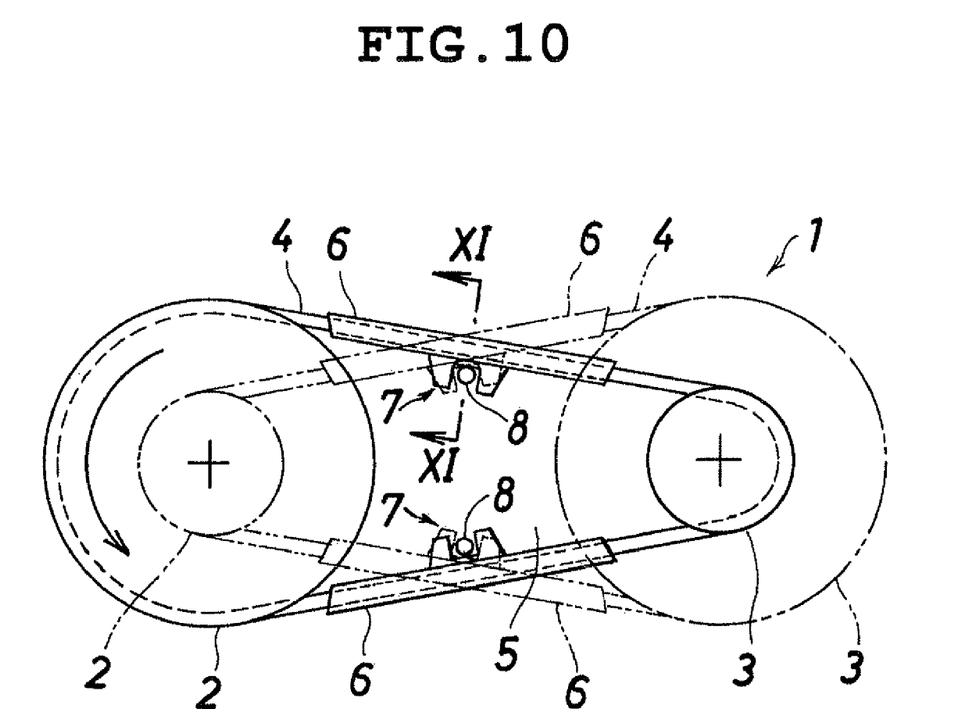
FIG. 10 is a front view of a power transmission device according to a seventh embodiment of the invention.

In FIG. 1, the stabilizer 6 is fitted only to the lower side string portion. Alternatively, the stabilizer 6 may be fitted only to the upper side string portion or may be fitted to each of both upper and lower side string portions. FIG. 10 shows an embodiment (seventh embodiment) in which the stabilizer 6 is fitted to each of both the upper and lower side string portions. As shown in FIG. 10, the power transmission device 1 includes upper and lower stabilizers 6 supported by the power transmitting chain 4 at positions between the primary pulley 2 and the secondary pulley 3. Accordingly, upper and lower fixing stoppers 8 are fitted to the casing 5. The stabilizer 6 and restricting device 7 according to any one of the first to sixth embodiments may be applied to the seventh embodiment shown in FIG. 10.

Figure 11:
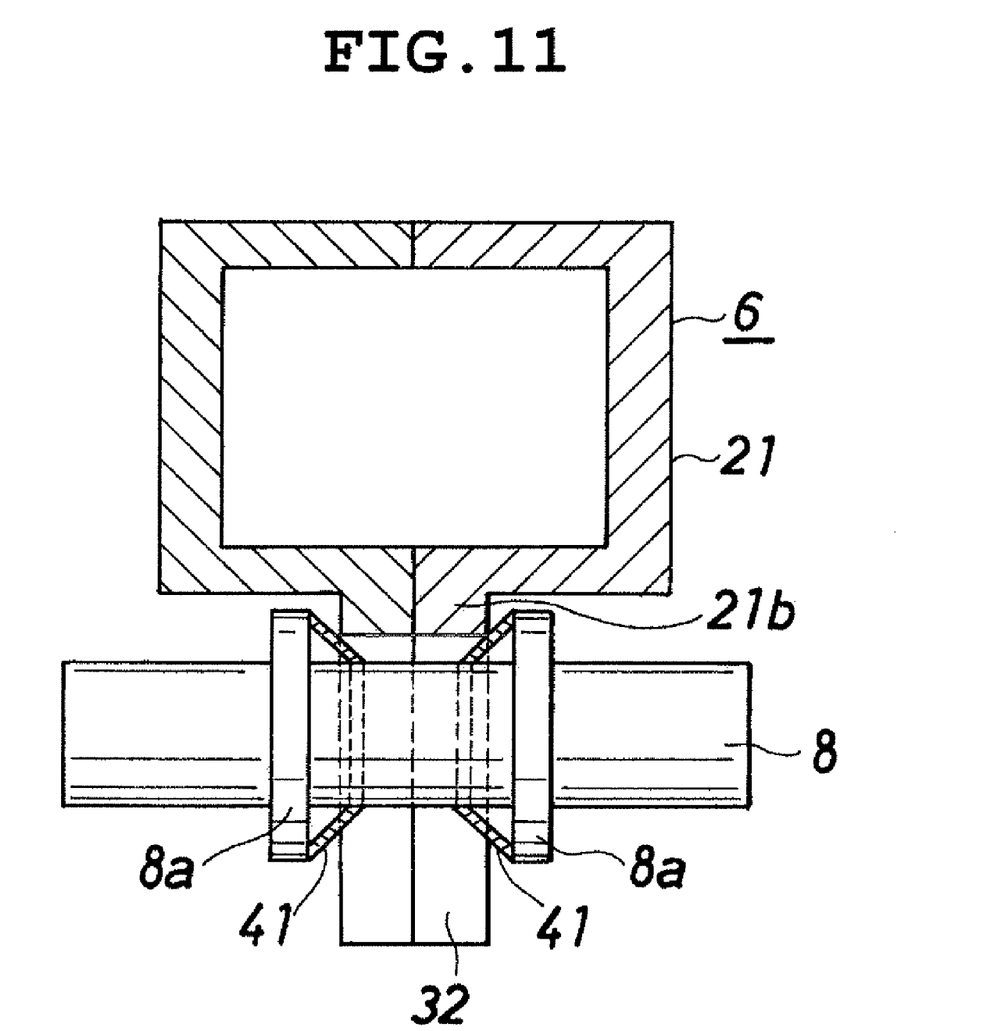
FIG. 11 is a cross-sectional view taken along the line XI-XI in FIG. 10, showing a main portion of a power transmission device according to an eighth embodiment of the invention.
Figure 12A:
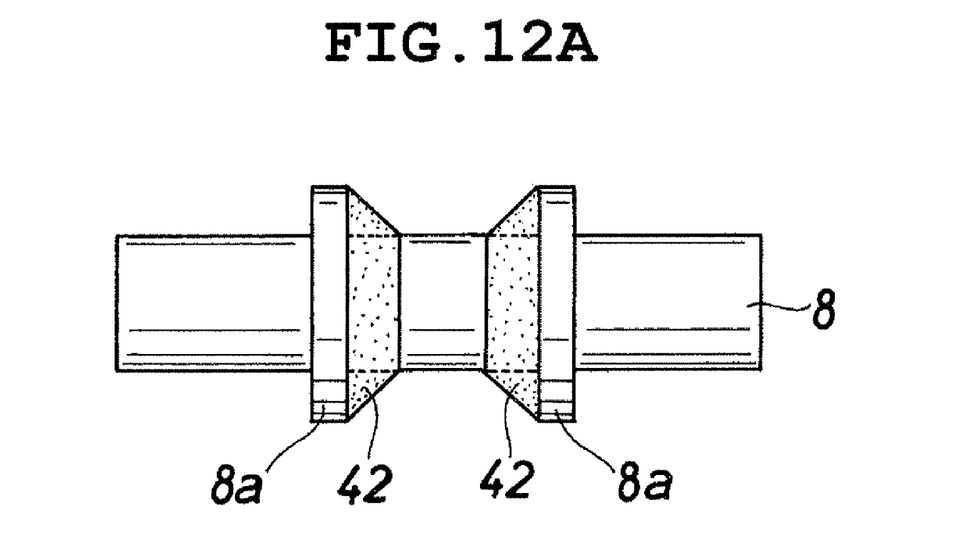
FIG. 12A and FIG. 12B are views that respectively show main portions of a power transmission device according to a ninth embodiment of the invention.
Figure 12B:
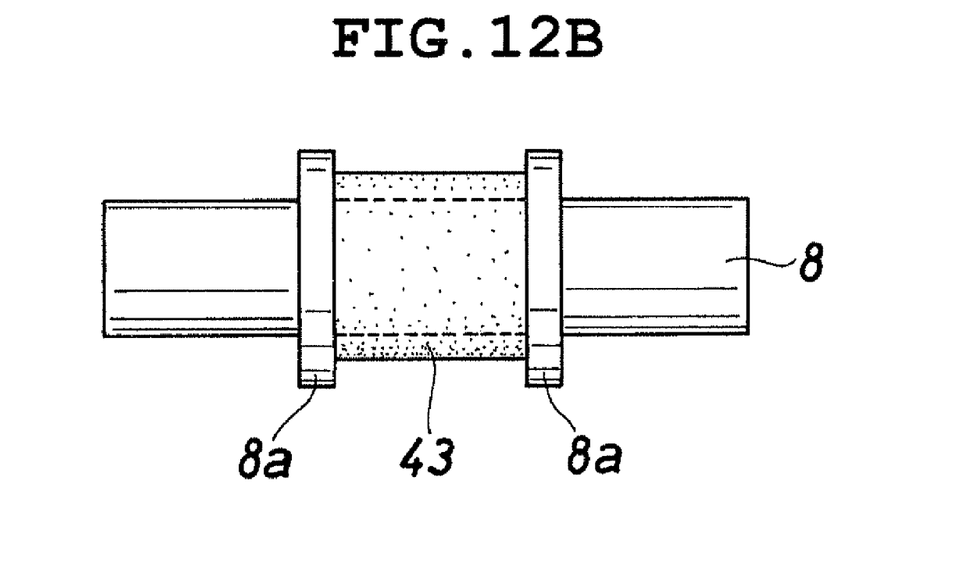

A shock absorbing member 41, 42 or 43 that absorbs a shock in the event of a contact between the stabilizer 6 and the fixing stopper 8 may be fitted not to the stabilizer 6 but to the fixing stopper 8 as shown in FIG. 11 (eighth embodiment) and FIG. 12A and FIG. 12B (ninth embodiment).

As shown in FIG. 11 illustrated as a cross-sectional view taken along the line XI-XI shown in FIG. 10, the fixing stopper 8 is provided with a pair of shock absorbing members 41 each of which is made of a metal plate spring. In addition, the body 21 of the stabilizer 6 has a rectangular protrusion 21b facing the fixing stopper 8, and the fixing stopper 8 has a pair of flanges 8a between which the protrusion 21b is interposed. Each shock absorbing member 41 is tapered, a large-diameter end portion is received by the flange 8a of the fixing stopper 8, and a small-diameter end portion is received by a portion of the fixing stopper 8, which is interposed between the paired flanges 8a. Thus, both corner portions of the protrusion 21b of the stabilizer body 21 are supported by the center portions of the shock absorbing members 41 each of which is made of a metal plate spring. Thus, the force that is applied from the stabilizer 6 to the fixing stopper 8 and the force that is applied from the fixing stopper 8 to the stabilizer 6 are reduced by the elastic force of the shock absorbing members 41. Therefore, a shock in the event of a contact between the stabilizer 6 and the fixing stopper 8 is absorbed.

FIG. 12A and FIG. 12B are views that respectively show fixing stoppers 8 that may be replaced by the fixing stopper 8 shown in FIG. 11. As shown in FIG. 12A and FIG. 12B, rubber shock absorbing members 42 and 43 are fitted to the respective fixing stoppers 8.

Each of the shock absorbing members 42 shown in FIG. 12A has an annular shape having a triangular cross section. The inner peripheral surface of each shock absorbing member 42 extends along a portion of the fixing stopper 8, which is interposed between the paired flanges 8a, and the outer peripheral surface of each shock absorbing member 42 has the same shape as the outer peripheral surface of each shock absorbing member 41 shown in FIG. 11. Thus, both corner portions of the protrusion 21b of the stabilizer body 21 are supported by the center portions of the rubber shock absorbing members 42. Thus, the force that is applied from the stabilizer 6 to the fixing stopper 8 and the force that is applied from the fixing stopper 8 to the stabilizer 6 are reduced by the elastic force of the shock absorbing members 42. Therefore, a shock in the event of a contact between the stabilizer 6 and the fixing stopper 8 is absorbed.

The shock absorbing member 43 shown in FIG. 12B is s single piece member, and is a cylindrical member that extends along a portion of the fixing stopper 8, which is interposer between the paired flanges 8a. Thus, the entire distal end surface of the protrusion 21b of the stabilizer body 21 is received by the rubber shock absorbing member 43. Thus, the force that is applied from the stabilizer 6 to the fixing stopper 8 and the force that is applied from the fixing stopper 8 to the stabilizer 6 are reduced by the elastic force of the shock absorbing members 42. Therefore, a shock in the event of a contact between the stabilizer 6 and the fixing stopper 8 is absorbed.

In the above first to ninth embodiments, if the location of the fixing stopper 8 is inappropriate, an unnecessary movement of the ribs 22 and 23; 24 and 25; or 32 and 33 with respect to the fixing stopper 8 (not a movement in a direction parallel to the traveling direction of the power transmitting chain 4 but a movement in a direction perpendicular to the traveling direction, or the like) increases. Accordingly, there is a possibility that the fixing stopper 8 does not contact the rib 22 or 23; 24 or 25; 32 or 33.

Then, as shown in FIG. 1 or FIG. 10, the fixing stopper 8 is arranged near the intersection of the power transmitting chain 4 when the speed ratio is maximum and the power transmitting chain 4 when the speed ratio is minimum. More preferably, the fixing stopper 8 is at a location at which the center (axis) of the fixing stopper 8 falls within a range of ±5 mm from the median value of the center-to-center distance between the pulleys 2 and 3.

Figure 13:
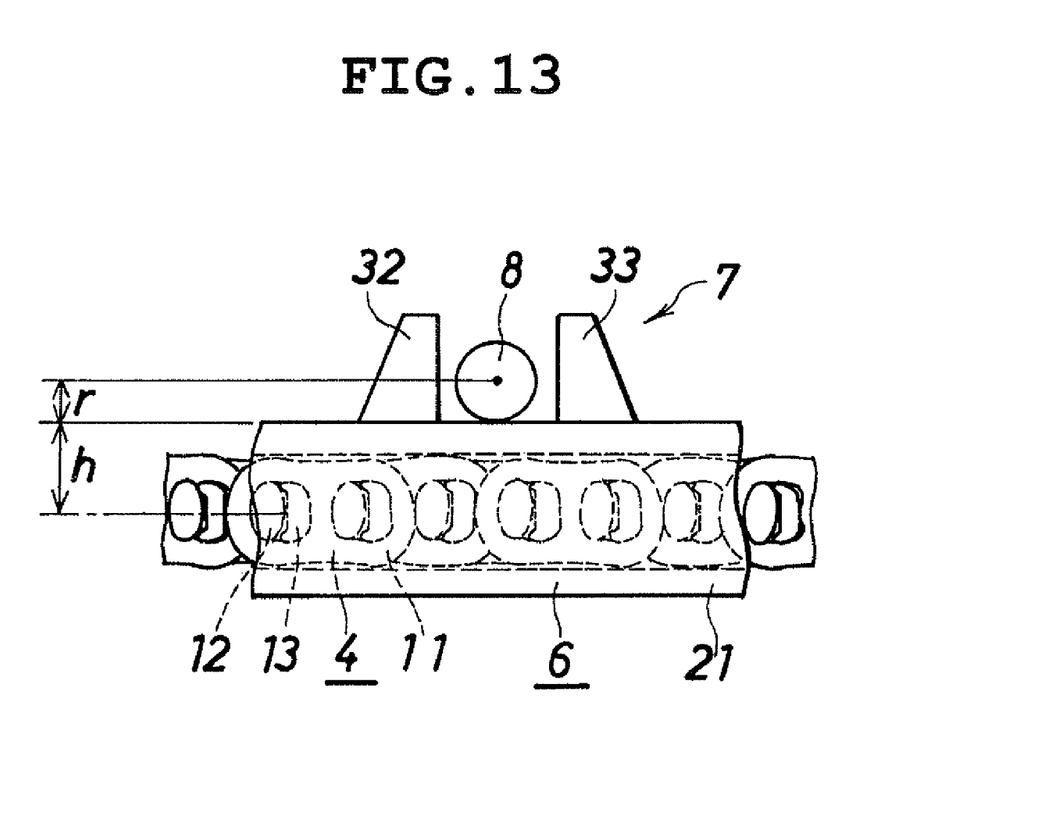
FIG. 13 is an enlarged front view of a main portion that shows a preferable location of a fixing stopper.

Then, more preferably, the fixing stopper 8 is in contact with the body 21 of the stabilizer 6 as shown in FIG. 13. In other words, more preferably, the fixing stopper 8 is arranged so as to be tangent to a parallel line that is offset by h (h is obtained by adding the thickness of the body 21 of the stabilizer 6 to half of the height of the power transmitting chain 4) from the center of the path of the power transmitting chain 4 at each speed ratio (the center of the fixing stopper 8 is located at h+r where the radius of the fixing stopper 8 is r).

Thus, the projection of each of the ribs 22, 23, 24, 25, 32 and 33 may be the minimum necessary. Therefore, reduction in size and weight of the power transmission device 1 is may be achieved and the cost of the power transmission device 1 may be reduced.

Note that the relationships shown in FIG. 7 are achieved not only in the case of a chain but also in the case of a belt. Therefore, in a belt-type power transmission device (continuously variable transmission) that includes a belt used as a looped transmitting member, it is possible to obtain the effect of reducing the string vibrations and increasing the natural frequency by using the stabilizer 6.

A power transmission device according to the invention includes: a primary pulley that is formed of a fixed sheave and a movable sheave; a secondary pulley that is formed of a fixed sheave and a movable sheave; a looped transmitting member that is looped over the primary pulley and the secondary pulley; a casing that accommodates the primary pulley, the secondary pulley and the looped transmitting member; and a tubular stabilizer which is arranged between the primary pulley and the secondary pulley and through which a string portion of the looped transmitting member is passed so as to be movable relative to the stabilizer whereby the stabilizer restricts movement of the looped transmission, wherein the stabilizer is supported by the looped transmitting member and is moved in the traveling direction of the looped transmitting member as the looped transmitting member moves in the traveling direction, and a movement of the stabilizer of which the amount is equal to or larger than a predetermined amount is restricted by a restricting device.

The power transmission device may be of a chain type (the looped transmitting member is a chain) or may be of a belt type (the looped transmitting member is a belt).

The power transmission device is suitably used as a continuously variable transmission of a vehicle, such as an automobile. In such a continuously variable transmission, the looped transmitting member is held between sheave surfaces of both sheaves, and the movable sheave is moved by a hydraulic actuator. Thus, the distance between the sheave surfaces of the continuously variable transmission is changed, and, consequently, the effective radius of the looped transmitting member is changed.

In the power transmission device, the speed ratio changes between the U/D state that has the maximum speed ratio and that corresponds to the low-speed drive and the O/D state that has the minimum speed ratio and that corresponds to the high-speed drive. In the U/D state, the effective radius on the primary pulley-side is minimum, and the effective radius on the secondary pulley-side is maximum. On the other hand, in the O/D state, the effective radius on the primary pulley-side is maximum, and the effective radius on the secondary pulley-side is minimum.

The string portion is a portion of the looped transmitting member, which is not retained by the pulleys. The length of the string portion means the length of the string portion in the U/D state.

The stabilizer is formed in, for example, a tubular shape having a rectangular cross section so that the looped transmitting member (belt or chain) can be passed through the stabilizer with a slight play. The stabilizer has a two-part shape and is fitted to the looped transmitting member looped over the both pulleys. The material of the stabilizer may be metal or synthetic resin. The two parts may be connected each other by fitting, welding, deposition or screwing. A restricting device constituent member (rib) that engages with the fixing stopper fitted to the casing is preferably formed integrally with the tubular body of the stabilizer. Anyway, the stabilizer is supported by the looped transmitting member, and it is not necessary to fix or fit the stabilizer to the casing. Thus, it is possible to omit the work for fitting and fixing the stabilizer to the fixing stopper fitted to the casing, which is required in the existing art. Therefore, the ease of assembly is enhanced and the cost is reduced.

The value obtained by adding a movement amount to the length of the stabilizer is smaller than the length of the string portion, and the stabilizer is allowed to move, along with the looped transmitting member, by a small amount within such a range that the stabilizer does not interfere with the pulleys. Then, when the stabilizer is moved by a predetermined amount, the restricting device prevents further movement of the stabilizer. In this state, only the looped transmitting member moves.

The restricting device preferably includes a fixing stopper that is fitted to the casing, a first rib that is fixed to the tubular body of the stabilizer and that contacts the fixing stopper during forward rotation to restrict the travel range of the stabilizer, and a second rib that is fixed to the tubular body of the stabilizer and that contacts the fixing stopper during reverse rotation to restrict the travel range of the stabilizer.

A gap is formed between the fixing stopper and each of the ribs. Thus, a shock of an impact between the fixing stopper and each of the ribs is reduced. The stabilizer is not supported by the casing but supported by the string portion of the looped transmitting member. Therefore, the natural frequency of the string portion increases. In the power transmission device of this type, the peak of frequency ($n^{th}$ order natural frequency) is present at 3000 Hz to 4000 Hz, and the frequency causes problematic noise. When the peak of frequency is higher than or equal to 8000 Hz, although the noise is within human audible zone, the noise does not give a discomfort. Therefore, the natural frequency of the string portion to which the stabilizer is fitted is preferably higher than or equal to 8000 Hz. The length of the stabilizer is preferably larger than or equal to 30% of the length of the string portion of the looped transmitting member. That is, the length of the stabilizer may be reduced to 30% of the length of the string portion using the value obtained by subtracting a movement amount from the length of the string portion as the maximum value. If the length of the stabilizer is set to, for example, a value obtained by subtracting a movement amount from the length of the string portion for the power transmission device having a relatively short string portion, this stabilizer may also be used for the power transmission device having a relatively long string portion.

The stabilizer is preferably adjustable in length so that it may be usable in various power transmission devices that differ in size. To achieve this, for example, a length adjusting attachment may be detachably attached to at least one end portion of the stabilizer, or a length adjusting attachment may be slidably fitted to at least one end portion of the stabilizer. For example, a stabilizer which has the minimum size and which conforms to the smallest power transmission device is produced. When the power transmission device is large, the length adjusting attachment may be attached to the basic stabilizer, or the length adjusting attachment may be extended. Thus, the length of the stabilizer is increased so that the stabilizer conforms to the large power transmission device.

The stabilizer moves with respect to the fixing stopper and contacts the fixing stopper. Therefore, the stabilizer is preferably provided with a shock absorbing member that absorbs a shock when the stabilizer contacts the fixing stopper in order to reduce contact noise and improve durability.

The shock absorbing member fitted to the stabilizer is made of a thin metal plate or rubber. In the case of the thin metal plate, a gap is preferably formed between the metal plate and the stabilizer so that a shock applied to the metal plate is not directly transmitted to the stabilizer. The rubber shock absorbing member has, for example, a U-shape in cross section, and is bonded to surfaces of the ribs, facing the fixing stopper, and a surface of the tubular body of the stabilizer, facing the fixing stopper. The shock absorbing member made of metal plate has, for example, peripheral portions that are formed at an opening of the shock absorbing member body portion having a U-shape in cross section. The peripheral portions are placed along the distal end portions of the ribs so that the shock absorbing member is attached to the stabilizer.

The shock absorbing member that absorbs a shock in the event of a contact between the stabilizer and the fixing stopper may be fitted to the fixing stopper.

The shock absorbing member fitted to the fixing stopper is made of a metal plate spring or rubber. In either case, the stabilizer preferably has a protrusion facing the fixing stopper and the protrusion is received by the shock absorbing member. In the case where the shock absorbing member is made of rubber, the shock absorbing member may receive the entire distal end surface of the protrusion or may receive both corner portions of the protrusion. In the case where the shock absorbing member is made of a metal plate spring, preferably, the shock absorbing member is made of a saucer thin metal plate so as to receive both corner portions of the protrusion.

In the above description, if the location of the fixing stopper is inappropriate, an unnecessary movement of the ribs with respect to the fixing stopper (not a movement in a direction parallel to the traveling direction of the looped transmitting member but a movement in a direction perpendicular to the traveling direction, or the like) increases. Therefore, it is necessary to take measures, such as increasing the protrusion (height) of each rib so that the fixing stopper is reliably in contact with any one of the ribs.

Then, preferably, the location of the fixing stopper falls within a range of ±5 mm from the median value of the center-to-center distance between the pulleys, and the fixing stopper is in contact with the tubular body of the stabilizer.

Thus, the projection of each rib may be the minimum necessary. Therefore, reduction in size and weight is possible and costs may be reduced.

In the power transmission device according to the invention, the tubular stabilizer is arranged between the primary pulley and the secondary pulley and the string portion of the looped transmitting member is passed through the stabilizer so as to be movable relative to the stabilizer, whereby movement of the looped transmitting member is restricted. Thus, the stabilizer reduces string vibrations and decreases the level of noise. In addition, the stabilizer is supported by the looped transmitting member and is moved in the traveling direction of the looped transmitting member as the looped transmitting member moves in the traveling direction. Therefore, the natural frequency of the string portion of the looped transmitting member increases. Accordingly, it is possible to change harsh noise to a sound that dose not give a discomfort. Hence, noise level is further decreased. In addition, a movement of the stabilizer of which the amount is larger than or equal to the predetermined amount is prevented by the restricting device. This prevents the stabilizer from interfering with the pulleys. Furthermore, it is not necessary to fix the stabilizer to the casing. Thus, it is possible to omit work for fitting and fixing the stabilizer to the fixing stopper fitted to the casing, which is required in the existing art. Therefore, the ease of assembly improves and the cost is reduced.

The invention claimed is:

1. A power transmission device comprising:
   a primary pulley that is formed of a fixed sheave and a movable sheave;
   a secondary pulley that is formed of a fixed sheave and a movable sheave;
   a looped transmitting member that is looped over the primary pulley and the secondary pulley;
   a casing that accommodates the primary pulley, the secondary pulley and the looped transmitting member; and
   a tubular stabilizer which is arranged between the primary pulley and the secondary pulley, and through which a string portion of the looped transmitting member is passed so as to be movable relative to the stabilizer whereby movement of the looped transmitting member is restricted,
   wherein the stabilizer is supported by the looped transmitting member and is moved in a traveling direction of the looped transmitting member as the looped transmitting member moves in the traveling direction,
   wherein a movement of the stabilizer of which an amount is equal to or larger than a predetermined amount is restricted by a restricting device,
   wherein the restricting device includes a fixing stopper that is fitted to the casing, a first rib that is fixed to a tubular body of the stabilizer and that contacts the fixing stopper during forward rotation to restrict a travel range of the stabilizer, and a second rib that is fixed to the tubular body of the stabilizer and that contacts the fixing stopper during reverse rotation to restrict a travel range of the stabilizer, and wherein a gap exists between the first rib and the fixing stopper and/or between the second rib and the fixing stopper.

2. The power transmission device according to claim 1, wherein the first rib and the second rib have facing surfaces each having an inverted tapered shape, and the facing surface of the first rib and the facing surface of the second rib form a retaining portion that prevents the stabilizer from slipping away from the fixing stopper.

3. The power transmission device according to claim 1, wherein a length adjusting attachment is detachably fitted to at least one end portion of the stabilizer.

4. The power transmission device according to claim 1, wherein a length adjusting attachment is slidably fitted to at least one end portion of the stabilizer.

5. The power transmission device according to claim 1, wherein a length of the stabilizer is larger than or equal to 30% of a length of the string portion of the looped transmitting member.

6. The power transmission device according to claim 1, wherein the stabilizer is provided with a shock absorbing member, and the shock absorbing member absorbs a shock in the event of a contact with the fixing stopper.

7. The power transmission device according to claim 1, wherein the fixing stopper is provided with a shock absorbing member that absorbs a shock in the event of a contact with the stabilizer.

* * * * *